United States Patent
Trimberger

(10) Patent No.: US 7,653,820 B1
(45) Date of Patent: Jan. 26, 2010

(54) SYSTEM AND METHOD FOR SECURING USING DECRYPTION KEYS DURING FPGA CONFIGURATION USING A MICROCONTROLLER

(75) Inventor: Stephen M. Trimberger, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 805 days.

(21) Appl. No.: 10/714,380

(22) Filed: Oct. 31, 2003

(51) Int. Cl.
*G06F 11/30* (2006.01)
*G06F 12/14* (2006.01)

(52) U.S. Cl. .................. 713/191; 713/189; 713/190; 380/44

(58) Field of Classification Search .............. 713/1, 713/2, 189, 190, 191, 193; 380/44, 45; 326/37–39; 716/16
See application file for complete search history.

(56) References Cited

U.S. PATENT DOCUMENTS

| | | | |
|---|---|---|---|
| 5,388,157 A * | 2/1995 | Austin | 713/191 |
| 5,408,661 A * | 4/1995 | Kuranaga | 710/1 |
| 5,991,858 A * | 11/1999 | Weinlander | 711/163 |
| 6,118,869 A * | 9/2000 | Kelem et al. | 380/44 |
| 6,356,637 B1 * | 3/2002 | Garnett | 380/265 |
| 6,366,117 B1 * | 4/2002 | Pang et al. | 326/38 |
| 6,496,971 B1 * | 12/2002 | Lesea et al. | 716/16 |
| 6,981,153 B1 * | 12/2005 | Pang et al. | 713/194 |
| 2001/0032318 A1 * | 10/2001 | Yip et al. | 713/190 |

* cited by examiner

*Primary Examiner*—Kimyen Vu
*Assistant Examiner*—Randal D Moran
(74) *Attorney, Agent, or Firm*—Pablo Meles; Kevin T. Cuenot; LeRoy D. Maunu

(57) ABSTRACT

A system for securely using decryption keys during FPGA configuration includes a FPGA having a microcontroller for receiving a bitstream having an encrypted bitstream portion as well as a configuration boot program. The configuration boot program can be code that runs on an embedded hardware microcontroller or a software microcontroller. The system further includes a key storage register coupled to the microcontroller for storing key data from the microcontroller, a decryptor coupled to the key storage register, and a configuration data register in the FPGA. Preferably, only the decryptor can read from the key storage register and the configuration data register cannot be read by the microcontroller after the decryptor is used.

15 Claims, 3 Drawing Sheets

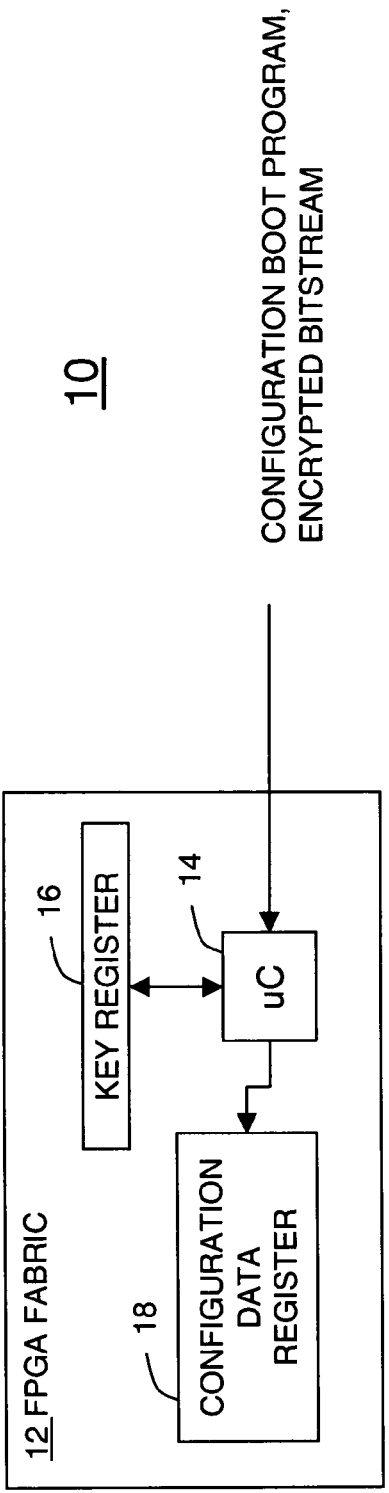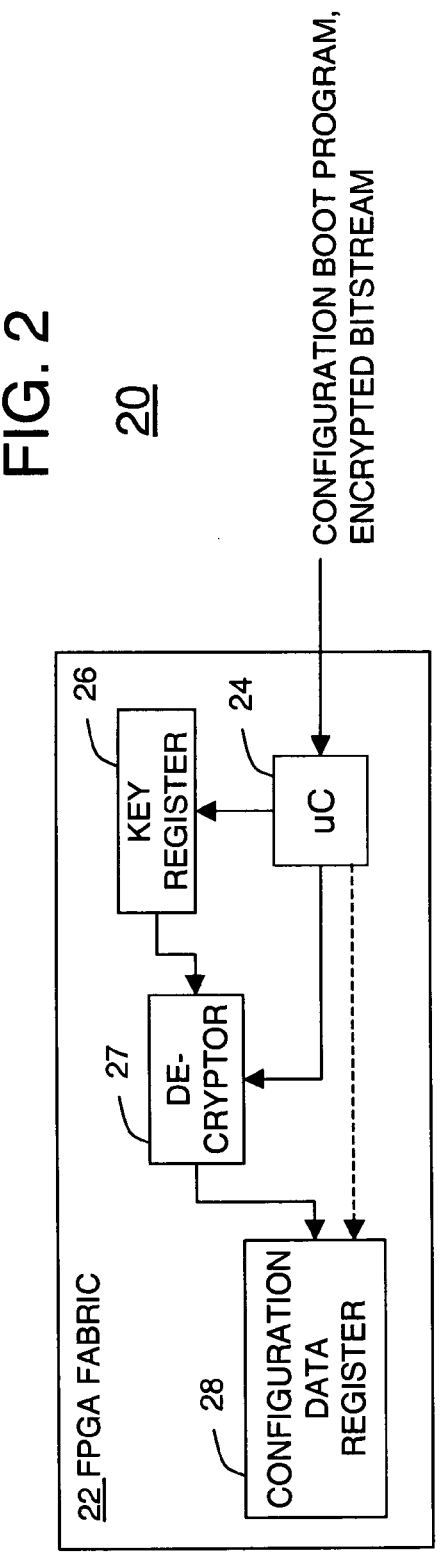

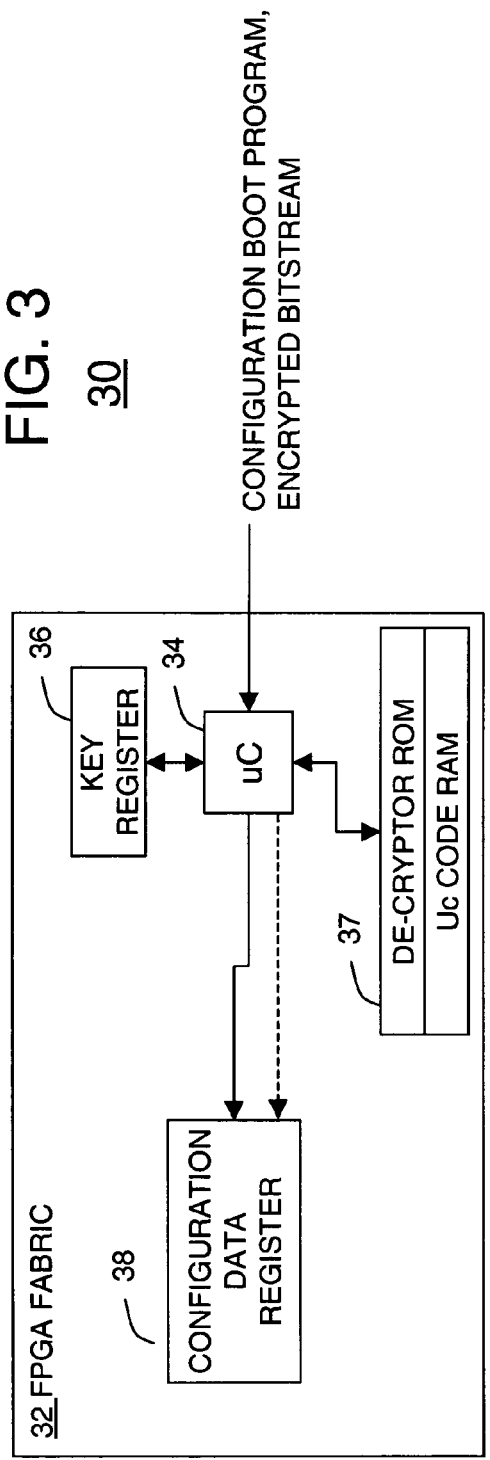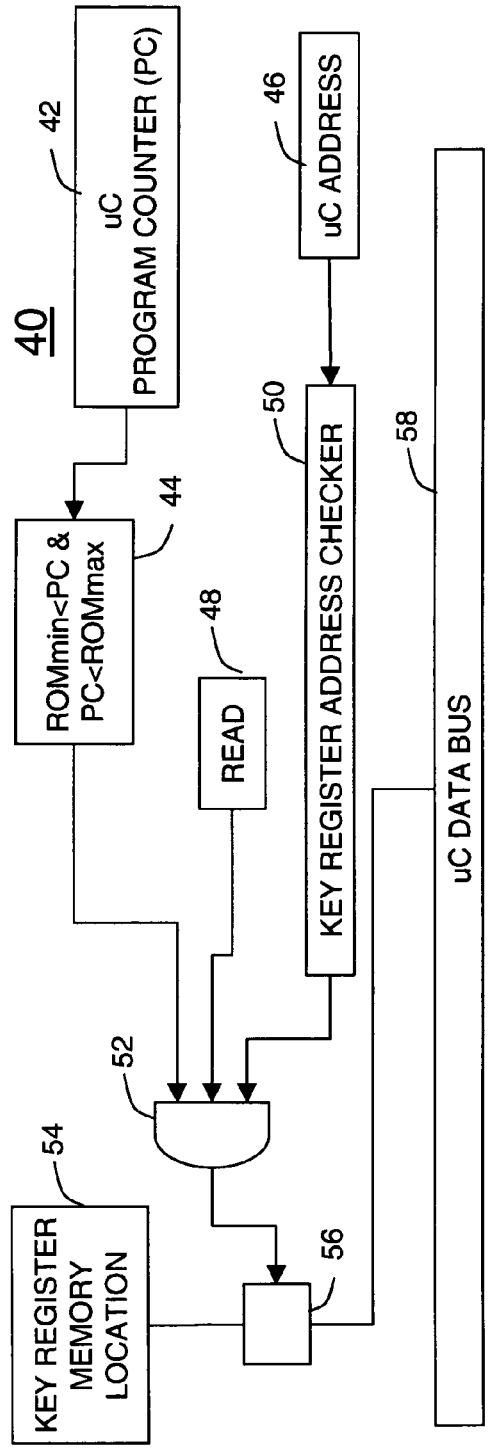

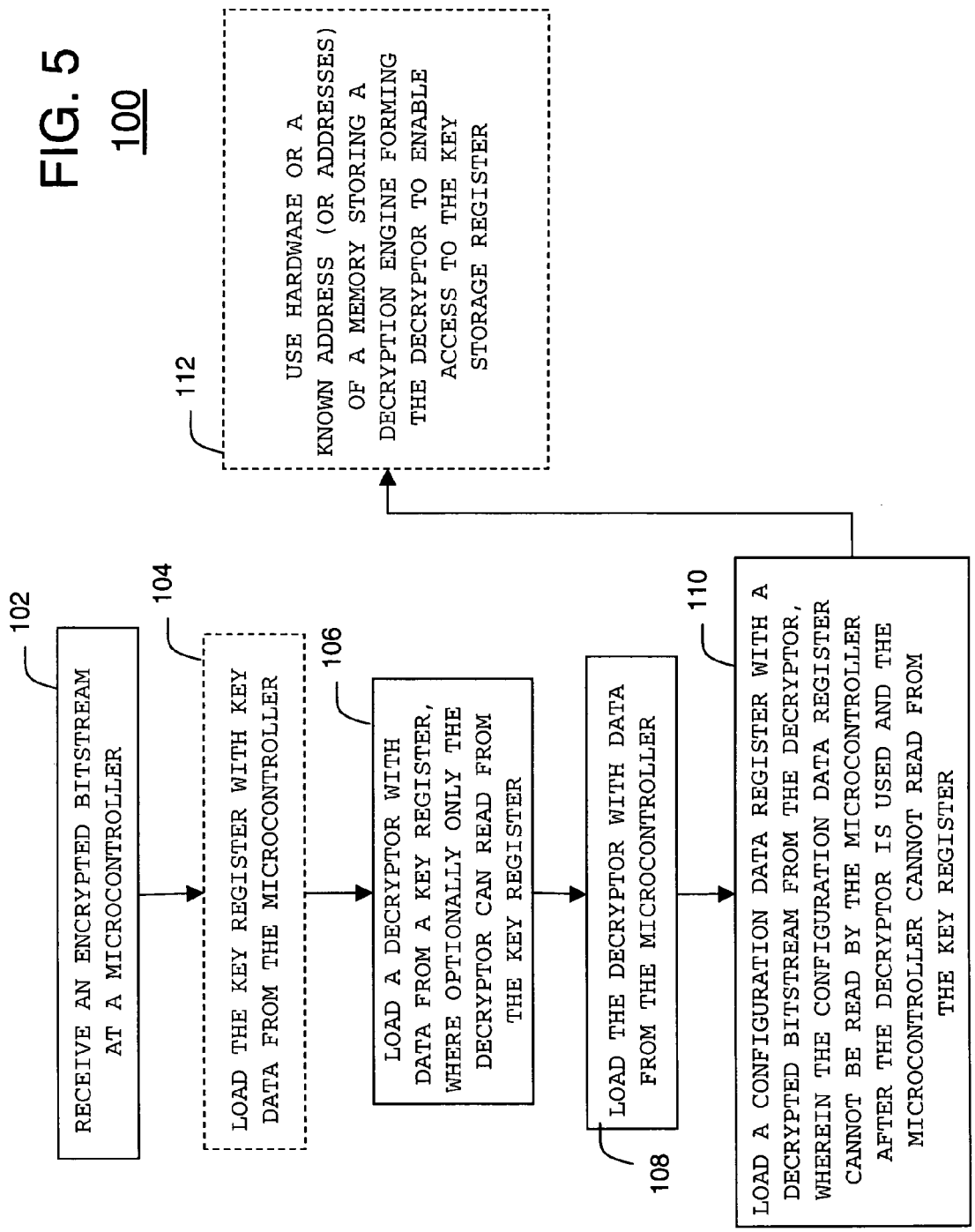

SYSTEM AND METHOD FOR SECURING USING DECRYPTION KEYS DURING FPGA CONFIGURATION USING A MICROCONTROLLER

BACKGROUND

1. Field of the Invention

This invention relates to the field of circuit design and, more particularly, to a system and method for securing data used to configure a programmable logic device (PLD).

2. Description of the Related Art

A PLD is a general purpose programmable device that is customizable by an end user to realize a desired user-specific device. One example of a PLD is a field programmable gate array (FPGA). The basic FPGA architecture involves an array of configurable logic blocks (CLBs) embedded in a configurable interconnect structure and surrounded by configurable I/O blocks (IOBs). In U.S. Pat. No. 6,496,971, Lesea and Trimberger have described an FPGA configuration structure where configuration is carried out by a microcontroller, for example a microprocessor. Configuration is the process of loading configuration data into the configuration memory cells which control the programmable interconnect structure, the IOBs, and the CLBs. The microcontroller may be used to read configuration data and write it to configuration memory cells. If the configuration data is encrypted, the microcontroller must also decrypt the data. A significant fraction of the configuration logic can be the bitstream decryptor. The decryptor would be a prime target for implementation in the microcontroller because it is large, is used rarely, and there are several different decryption algorithms that one might use.

In order to reduce the amount of dedicated read-only memory on the chip and to permit updates to the configuration process, the microcontroller configuration boot program can be loaded from an external source when the FPGA configures. A decryption key may be stored in a volatile or non-volatile register. A common method of connecting this register, whether volatile or non-volatile, is by the well-known method of memory mapping. Using memory-mapping, the system includes a decoder and enabling logic that permits the register to be read and written by the microcontroller as if it was ordinary memory. The simple method of storing and using decryption keys as a memory-mapped register connected to the microcontroller is un-secure and can lead to a pirate stealing the key data or the decrypted design by providing a "Trojan-horse" configuration boot program that writes the contents of the key register to a block random access memory (BRAM) or to chip IOs. What is needed is a structure and method that permits a microcontroller to store and use decryption keys in a secure manner.

SUMMARY OF THE INVENTION

The present invention provides a method, system, and apparatus for securely using decryption keys during FPGA configuration. One embodiment of the present invention can include a system of securely using decryption keys during PLD configuration. The system can include a microcontroller, for example a hard or soft microprocessor, for receiving an encrypted bitstream, a key storage register coupled to the microcontroller for storing key data (optionally, from the microcontroller), a decryptor coupled to the key storage register, and a configuration data register in the FPGA. Preferably, only the decryptor can read from the key storage register and the configuration data register cannot be read by the microcontroller after the decryptor is used (or additionally, while the decryptor is being used). The decryptor can be a hardware decryptor embedded in an integrated circuit along with the PLD or a software decryptor stored in a memory that uses hardware to enable access to the key storage register based on a memory address. The microcontroller, the key register, the decryptor, and the configuration data register are all within the PLD and the microcontroller can be a hardware controller or an emulated microcontroller.

In another embodiment of the invention, a system of securely using decryption keys during configuration of an integrated circuit having programmable logic can include a microcontroller for receiving an encrypted bitstream, a key storage register coupled to the microcontroller for storing key data (optionally, from the microcontroller), a decryption program stored in a memory that uses a predetermined memory address (or set of memory addresses) to enable access to the key storage register, and a configuration data register in the PLD, wherein the configuration data register cannot be read by the microcontroller after the decryption program is used (or additionally, while the decryptor is being used). The decryption program can be a decryption engine stored in a ROM.

In yet another embodiment in accordance with the present invention, a system of securely using decryption keys during PLD configuration can include a memory-mapped key register, a decryptor engine stored in non-volatile memory and coupled to the microcontroller data bus, and logic circuitry limiting access to the key register from the microcontroller data bus using specified addresses of the non-volatile memory.

In yet another aspect, a method of securely using decryption keys during FPGA configuration can include the steps of receiving an encrypted bitstream at a microcontroller, loading a decryptor with data from a key register, loading the decryptor with data from the microcontroller, and loading a configuration data register with a decrypted bitstream from the decryptor, wherein the configuration data register cannot be read by the microcontroller after the decryptor is used. The method can also include the step of loading the key register with key data from the microcontroller. The logic circuitry can use specified addresses of the non-volatile memory by limiting access to minimum and maximum ROM memory addresses using a microcontroller program counter.

In another embodiment, a bitstream used for a programmable logic device can include a configuration boot program for running a microcontroller on the programmable logic device and an encrypted bitstream portion of the bitstream containing encrypted configuration data for a configuration data register on the programmable logic device.

BRIEF DESCRIPTION OF THE DRAWINGS

There are shown in the drawings, embodiments which are presently preferred, it being understood, however, that the invention is not limited to the precise arrangements and instrumentalities shown.

FIG. 1 is a schematic diagram illustrating an exemplary FPGA in accordance with one embodiment of the inventive arrangements disclosed herein.

FIG. 2 is a schematic diagram illustrating another exemplary FPGA design in accordance with a second embodiment of the inventive arrangements disclosed herein.

FIG. 3 is a schematic diagram illustrating yet another exemplary FPGA circuit design in accordance with the present invention.

FIG. 4 is a schematic diagram illustrating logic circuitry in accordance with an embodiment of the inventive arrangements disclosed herein.

FIG. 5 is a flow chart illustrating a method of securing using decryption keys when programming an FPGA.

DETAILED DESCRIPTION OF THE INVENTION

The present invention provides a solution for enabling a microcontroller to store and use decryption keys in a secure manner.

In a first embodiment as shown in FIG. 1, a configuration boot program and an encrypted bit stream containing at least configuration data for a configuration data register 18 on a FPGA 12 is shown. The bitstream can be used for a programmable logic device such as the FPGA 12 in a system 10. The bitstream can include a configuration boot program for running a microcontroller 14 on the programmable logic device and an encrypted bitstream portion of the bitstream containing encrypted configuration data for a configuration data register 18. The system can include a key register 16 as well. As mentioned above, although the bitstream is novel and nonobvious, this simple method of storing and using decryption keys as a register connected to a microcontroller is un-secure and subject to pirating.

Referring to FIG. 2, a better solution of securely using decryption keys during PLD configuration is illustrated by system 20. The system 20 can include a PLD such as an FPGA 22 having a microcontroller 24 for receiving a bitstream having an encrypted bitstream portion as well as a configuration boot program. The microcontroller 24 may include an embedded microprocessor such as the PowerPC® from IBM® Inc. of Armonk, N.Y., or a soft processor such as Microblaze™ from Xilinx® Inc. Of San Jose Calif. The configuration boot program can be code that runs on the embedded microprocessor or the soft processor. In one alternative, the bitstream can include code to emulate a microcontroller as well as the configuration boot program for the emulated microcontroller. The system 20 further comprises a key storage register 26 coupled to the microcontroller 24 for storing key data, optionally from the microcontroller 24, a decryptor 27 coupled to the key storage register, and a configuration data register 28 in the FPGA 22. Preferably, only the decryptor 27 can read from the key storage register 26 and the configuration data register 28 cannot be read by the microcontroller 24 after the decryptor 27 is used (in addition, the configuration data register 28 cannot be read by the microcontroller 24 while the decryptor 27 is being used). This disabling of access to the configuration data register can be accomplished by the addition of a status bit cleared when configuration memory is cleared and set when the decryptor is used. The status bit is used as an additional signal gating the read of the configuration data register onto the processor data bus. The decryptor 27 can be a hardware decryptor embedded in an integrated circuit along with the FPGA as shown in FIG. 2 or a software decryptor stored in a memory that uses a predefined instruction enabling access to the key storage register based on an address of the memory as will be further described with respect to FIGS. 3 and 4. The microcontroller 24, the key register 26, the decryptor 27, and the configuration data register 28 are all within the FPGA 22 and the microcontroller 24 can be a hardware microcontroller, a software microcontroller or an emulated microcontroller as previously described. Note that the microcontroller 24 can optionally access the configuration data register 28 when the decryptor 27 has not been used to configure the register 28.

Referring to FIG. 3, a system 30 of securely using decryption keys during FPGA configuration can include an FPGA 32 having a microcontroller 34 for receiving a bitstream including an encrypted bitstream portion and a configuration boot program, a key storage register 36 coupled to the microcontroller 34 for storing key data optionally from the microcontroller 34, a decryption program stored in a memory 37 that uses a special or predetermined instruction stored in ROM enabling access to the key storage register based on an address or addresses of the ROM in memory 37, and a configuration data register 38 in the FPGA, wherein the configuration data register 38 cannot be read by the microcontroller after the decryption programmed is used. The decryption program can be a decryption engine stored in a non-volatile memory such as a ROM. Note once again that the microcontroller 34 can optionally access the configuration data register 38 when the decryptor program (37) has not been used to configure the register 38.

Referring to FIG. 4, a system 40 of securely using decryption keys during FPGA configuration can include a memory-mapped key register 54 (this is one example of key register 36 of FIG. 3), a microcontroller data bus 58, a decryptor engine stored in non-volatile memory (e.g., Decryptor ROM 37 of FIG. 3) that is executed on a microcontroller (e.g., uC 34 of FIG. 3), and logic circuitry limiting access to the key register memory location 54 to specified or predetermined instruction addresses of the non-volatile memory. When the microcontroller attempts to read the key register memory location 54, it, e.g., uC 34, activates signal read 48 and sets the address on the address bus 46 to the address of the key register memory location 54. A key register address checker 50 matches the address on the address bus 46 to the address of the key register memory location 54. In one embodiment as shown, a gate 56 is enabled to provide access to the key register memory location 54 by the microcontroller data bus 58 only when the output of AND gate 52 is TRUE. The output of AND gate 52 is TRUE when a read signal 48 is asserted, the address on address bus 46 matches the key register memory address, and microcontroller program counter 42 has an address within the range of ROM addresses containing the decryptor code. In this instance, the microcontroller program counter 42 in conjunction with an equation 44 (, e.g., the PC has an address greater than [or greater than and equal to] the minimum address of the decryptor code in ROM (ROMmin) and less than [or less than and equal to] the maximum address of the decryptor code in ROM (ROMmax)) can be used to make sure only ROM addresses containing the decryptor code are provided access to the key register memory location 54.

Referring to FIG. 5, a flow chart is shown illustrating a method 100 of securely using decryption keys during PLD, such as an FPGA, configuration can include the steps of receiving at step 102 an encrypted bitstream at a microcontroller, loading at step 106 a decryptor with data from a key register, loading at step 108 the decryptor with data from the microcontroller, and loading a configuration data register with a decrypted bitstream from the decryptor at step 110. Preferably, the configuration data register cannot be read by the microcontroller after the decryptor is used. The method 100 may also include, optionally, the step of loading the key register with a key or key data from the microcontroller at step 104. Typically, the key or key data in this scenario can be loaded at the manufacturing site of the FPGA onto a backup memory, but other arrangements can be made to load the key or key data onto the key register including enabling a customer to load the key register. In any event, the microcontroller can be programmed to not read from the key register (after configuration) and the decryptor can be designed to only read from a memory-mapped key storage register. The logic circuitry for decrypting and enabling the microcontroller to access the key register can use specified addresses of the non-volatile memory by limiting access to minimum and maximum ROM memory addresses using a microcontroller program counter. In other words, the steps of loading the decryptor with data from the key register and loading the decryptor with data from the microcontroller can include using a predetermined instruction enabling access to the key storage register based on a known address or addresses of a memory storing a decryption engine forming the decryptor as shown in step 112.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A system of securely using decryption keys during configuration of an integrated circuit having programmable logic, comprises:
   a microcontroller within the integrated circuit for receiving an encrypted bitstream;
   a key storage register coupled to the microcontroller for storing key data;
   a decryptor coupled to the key storage register, wherein only the decryptor reads from the key storage register; and
   a configuration data register in the integrated circuit, wherein the configuration data register is readable by the microcontroller before the decryptor is used and the configuration data register cannot be read by the microcontroller after the decryptor is used,
   wherein the decryptor is a software decryptor stored in a memory and executed by the microcontroller, wherein the system further comprises hardware, independent of the microcontroller, that allows the microcontroller access to the key storage register by unblocking a signal path coupling the microcontroller and the key storage register when a program counter of the microcontroller specifies an address within an address range corresponding to the software decryptor within the memory and disallows the microcontroller access to the key storage register by blocking the signal path coupling the microcontroller and the key storage register.

2. The system of claim 1, wherein the memory is a ROM having a decryption engine.

3. The system of claim 1, wherein the microcontroller further receives a configuration boot program comprising the decryptor in programmatic form along with the encrypted bitstream comprising encrypted configuration data to be loaded into the configuration data register.

4. The system of claim 1, wherein the microcontroller, the key register, the decryptor, and the configuration data register are all within the integrated circuit.

5. The system of claim 1, wherein the microcontroller is an emulated microcontroller in the integrated circuit.

6. A system of securely using decryption keys during configuration of an integrated circuit having programmable logic, comprising:
   a microcontroller within the integrated circuit for receiving an encrypted bitstream;
   a key storage register coupled to the microcontroller for storing key data;
   a decryption program stored in a memory that uses a predetermined memory address to enable access to the key storage register; and
   a configuration data register in the integrated circuit, wherein the configuration data register is readable by the microcontroller before the decryption program is used and the configuration data register cannot be read by the microcontroller after the decryption program is used;
   wherein access to the key storage register by the microcontroller is allowed only when a program counter of the microcontroller specifies an address within an address range corresponding to the decryption program in the memory by unblocking a signal path coupling the microcontroller and the key storage register,
   wherein access to the key storage register by the microcontroller is disallowed when the program counter of the microcontroller specifies an address outside of an address range corresponding to the decryption program in the memory by blocking the signal path coupling the microcontroller and the key storage register.

7. The system of claim 6, wherein the memory is a ROM containing a decryption engine.

8. The system of claim 6, wherein the microcontroller further receives a configuration boot program along with the encrypted bitstream.

9. A method of securely using decryption keys during configuration of an integrated circuit comprising programmable logic, comprising the steps of:
   receiving an encrypted bitstream at a microcontroller within the field programmable gate array;
   loading a decryptor with data from a key register;
   loading the decryptor with data from the microcontroller;
   loading a configuration data register with a decrypted bitstream from the decryptor, wherein the configuration data register is readable by the microcontroller before the decryptor is used and the configuration data register cannot be read by the microcontroller after the decryptor is used;
   enabling access to the key register by unblocking a signal path coupling the microcontroller and the key register only when a program counter of the microcontroller specifies an address within an address range of the decryptor; and
   disabling access to the key register by blocking the signal path coupling the microcontroller and the key register when the program counter of the microcontroller specifies an address outside of the address range of the decryptor.

10. The method of claim 9, wherein the method further comprises the step of loading the key register with key data from the microcontroller.

11. The method of claim 9, wherein the configuration data register cannot be read by the microcontroller while the decryptor is used.

12. The method of claim 9, wherein the microcontroller cannot read from the key register.

13. The method of claim 9, wherein only the decryptor can read from the key register.

14. A tangible computer-readable medium having stored thereon a bitstream that configures an integrated circuit comprising programmable logic, the computer-readable medium comprising:
   a configuration boot program portion of the bitstream that runs a microcontroller on the integrated circuit; and
   an encrypted bitstream portion of the bitstream containing encrypted configuration data that when decrypted and loaded into a configuration data register on the integrated circuit configures the programmable logic,
   wherein the configuration boot program further comprises instructions for a decryptor, wherein the configuration boot program stores the instructions for the decryptor in a memory, wherein the decryptor is executed by a microcontroller and decrypts the encrypted bitstream using key data stored within a key storage register, and wherein access to the key storage register by the microcontroller is selectively permitted by blocking or unblocking a signal path coupling the microcontroller to the key storage register according to whether a program counter of the microcontroller specifies an address within an address range corresponding to the decryptor within the memory, wherein the decryptor loads the configuration data register with the decrypted bitstream, the configuration data register is readable by the microcontroller before the decryptor is used, and the configuration data register cannot be read by the microcontroller after the decryptor is used.

15. The tangible computer-readable medium of claim 14, wherein the configuration boot program comprises instructions for a decompressor.

* * * * *

UNITED STATES PATENT AND TRADEMARK OFFICE
CERTIFICATE OF CORRECTION

PATENT NO.       : 7,653,820 B1                                        Page 1 of 1
APPLICATION NO. : 10/714380
DATED            : January 26, 2010
INVENTOR(S)      : Stephen M. Trimberger It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1069 days.

Signed and Sealed this

Twenty-third Day of November, 2010

David J. Kappos
*Director of the United States Patent and Trademark Office*